United States Patent [19]
Suzuki

[11] Patent Number: 5,282,387
[45] Date of Patent: Feb. 1, 1994

[54] SHOCK SENSOR

[75] Inventor: Otohiko Suzuki, Tokyo, Japan

[73] Assignee: Takata Corporation, Tokyo, Japan

[21] Appl. No.: 773,704

[22] Filed: Oct. 9, 1991

[30] Foreign Application Priority Data

Nov. 2, 1990 [JP] Japan .................................. 2-297849
Nov. 2, 1990 [JP] Japan .................................. 2-297850

[51] Int. Cl.⁵ ................................................ G01P 15/08
[52] U.S. Cl. ...................................... 73/517 R; 310/329
[58] Field of Search ............. 73/517 R; 310/329, 348, 310/354

[56] References Cited

U.S. PATENT DOCUMENTS 3,042,744 7/1962 Shoor .
3,233,465 2/1966 Tolliver et al. .
3,397,329 8/1968 Riedel .
3,487,238 12/1969 Angleton et al. .
4,495,433 1/1985 Sheridan ........................... 73/517 R
4,644,181 2/1987 Mosconi et al. ..................... 310/329
4,827,091 5/1989 Behr .

FOREIGN PATENT DOCUMENTS 2463413 2/1981 France .

Primary Examiner—Robert Raevis
Attorney, Agent, or Firm—Kanesaka and Takeuchi

[57] ABSTRACT

A shock sensor comprises: a piezoelectric element for generating, when pushed, a voltage having a level according to the pushing force; an inertia member held in close contact with the piezoelectric element; and holding means for holding the piezoelectric element and the inertia member in the close contact. The inertia member pushes the piezoelectric element with the pushing force according to a shock, if this shock is applied to the shock sensor, so that the piezoelectric element generates a voltage having a level according to the pushing force.

9 Claims, 7 Drawing Sheets

SHOCK SENSOR

BACKGROUND OF THE INVENTION

1. Field of the Invention

The present invention relates to a shock sensor which is suited for an automotive air bag system for protecting an automotive passenger against shocks at a time of collision.

2. Related Art

In recent years, there is a tendency of increasing the number of automobiles which are equipped with air bag systems for protecting drivers or the like against the shocks.

This air bag system is adapted to inflate the air bag at an instant when it detects a collision. This operation is highly dependent upon the performance of a sensor for detecting the shocks of the collision.

As an acceleration sensor for detecting a large change in the velocity to be caused upon a collision of the vehicle, there has been disclosed in U.S. Pat. No. 4,827,091 a system comprising: a cylinder made of an electrically conductive material; a magnetized inertia member so fitted in the cylinder as to move in the longitudinal directions; an electric conductor disposed at the face of at least one end of the magnetized inertia member in at least the longitudinal direction of the cylinder; a pair of electrodes arranged at one longitudinal end of the cylinder and rendered conductive through said conductor when the magnetized inertia member comes into contact with the conductor; and an attraction member arranged at the longitudinal other end of the cylinder and made of such a magnetic material as to magnetically attracting said magnetized inertia member.

In this acceleration sensor, the magnetized inertia is attracted by the attraction member so that it is left stationary at the other end in the cylinder while no or little acceleration is applied to the acceleration sensor.

If a considerable acceleration is applied to this acceleration sensor, the magnetized inertia member is moved against the attraction of the attraction member. While the magnetized inertia member is being moved, an induction current flows through the cylinder to establish a magnetic force for urging the magnetized inertia member in the direction opposite to the moving direction so that the magnetized inertia member is braked to have its moving velocity reduced.

If the acceleration is lower than the predetermined (threshold) value, the magnetized inertia member fails to reach the leading end of the cylinder and stops in the course of its movement until it is returned to the other end by the attracting force of the attraction member.

If the acceleration exceeds the predetermined (threshold) value (e.g., if the vehicle carrying the acceleration sensor collides), the magnetized inertia member reaches the one end of the cylinder. Then, the conducting layer of the leading end of the magnetized inertia member comes into contact with both of the paired electrodes to establish the conduction therebetween. If a voltage is applied in advance between the electrodes, an electric current flows between the electrodes when the electrodes are short-circuited. It is detected in terms of this current that the vehicle has collided.

In the sensor of U.S. Pat. No. 4,827,091, the paired electrodes are connected when the magnetized inertia member moves to its forward limit. In order for the sensor to operate normally for a long time of period, it is necessary that the inner face of the cylinder to slide on the magnetized inertia member should be smooth and free from any corrosion. Moreover, the electrodes and the magnetized inertia member should also be free from any corrosion or rust. Thus, the cylinder has to be made of a highly corrosion-resistive material and to have its inner face elaborately polished or finished to raise the production cost. Moreover, the electrodes and so on have to be plated with gold to prevent the corrosion.

OBJECTS AND SUMMARY OF THE INVENTION

An object of the present invention is to provide a shock sensor which is enabled to have a quick transmission of shocks at a time of collision, i.e., to have a quick response by having an inertia member contacting closely with a piezoelectric element.

Another object of the present invention is to provide a shock sensor which can be easily self-checked by incorporating an electromagnet for pushing the inertia member and by connecting an output cable with a check circuit.

According to the present invention, there is provided a shock sensor which comprises: a piezoelectric element for generating, when pushed, a voltage having a level according to the pushing force; an inertia member held in close contact with the piezoelectric element; and a holding member for holding the piezoelectric element and the inertia member in the close contact, wherein the inertia member pushes the piezoelectric element with the pushing force according to a shock, if this shock is applied to the shock sensor, so that the piezoelectric element generates a voltage having a level according to the pushing force.

This holding member may be preferably exemplified by a combination of a bolt and a nut or by a rivet.

Preferably, in the sensor of the present invention: the inertia member is so made of an electrically conductive material in at least its face contacting with the piezoelectric element as to act as an electrode; an electrode having an opposite polarity is disposed at the side opposite to the inertia member across the piezoelectric element; and the inertia member, the piezoelectric element and the electrode are held by the holding means.

In the present invention, an electrode may be interposed between the inertia member and the piezoelectric element.

In another mode of the present invention, there is provided a device which is made receptive of the output volgage of the piezoelectric element for deciding whether or not the output voltage is higher than a predetermined voltage, to output a signal for inflating an air bag if the predetermined voltage is exceeded.

In still another mode of the present invention, there is provided an electromagnetic device which has a moving iron core for applying an external force to the inertia member in a direction to push the piezoelectric element so that the operations of the shock sensor can be checked by energizing the electromagnetic device.

In the shock sensor of the present invention, if a high external force is applied at a time of the collision of the vehicle, the inertia member pushes the piezoelectric element so that the piezoelectric element generates a voltage according to the shocking force. The collision of the vehicle can be detected by deciding the level of the voltage.

In case an operation checking electromagnetic device is provided, the inertia member can be hit with a predetermined force by the moving iron core of the electromagnetic device having its coil energized, to check whether or not the piezoelectric element generates a predetermined voltage.

In the sensor of the present invention, the inertia member is in close contact with the piezoelectric element so that the shock transmission is quick at the collision time. This shortens the response time of the shock sensor.

If, in the present invention, an electromagnet for pushing the inertia member is incorporated and if the output cable is connected with the check circuit, the shock sensor can be easily self-checked.

Since the shock sensor of the present invention has no moving part, it can be hardly fatigued by the vibrations to increase the intrinsic number of vibrations as the sensor. Moreover, since there is no moving part, malfunction due to the wear or corrosion does not occur. In addition, the present invention has no electric contact exposed to the atmosphere so that it can be free from any inconduction due to the corrosion. Thus, the shock sensor of the present invention has no possibility of degrading its characteristics, even if it is mounted on the vehicle, so that it can have an excellent durability and a high reliability.

The present invention is directed to a system capable of outputting the shocks in terms of a change in the electric energy. This makes it possible to achieve a record (or shock data) with time. As a result, by analyzing the timely shock fluctuating wave with a microcomputer disposed in the inflater operating circuit, it is possible to decide whether the shocks are caused by the collision or by the hammer (i.e., a quasi-collision).

According to another mode of the present invention, a shock sensor which comprises: a piezoelectric element for generating, when pushed, a voltage having a level according to the pushing force; an inertia member held in close contact with the piezoelectric element; an impedance converter made receptive of the voltage generated by the piezoelectric element; and a casing accommodating the piezoelectric element, the inertia member and the impedance converter, wherein the inertia member pushes the piezoelectric element with the pushing force according to a shock, if this shock is applied to the shock sensor, so that a voltage having a level according to the pushing force is generated from the piezoelectric element and outputted through the impedance converter.

In this shock sensor, the piezoelectric element is pushed by the inertia member, in case a high external force is applied at the time of collision of the vehicle, so that the piezoelectric element generates a voltage according to the shocking force. This output voltage is outputted after it has been subjected to an impedance conversion by the impedance converter. The collision of the vehicle can be detected by deciding the level of the output voltage.

Since, in the present invention, the impedance converter is assembled together with the piezoelectric element and the inertia member in the casing, the output of the shock sensor of the present invention can be fed as it is to the control device in case the shock sensor is mounted in the vehicle. Moreover, the output impedance of the sensor can be reduced to stabilize the shock detection.

DESCRIPTION OF THE PREFERRED EMBODIMENTS

The present invention will be described in the following in connection with the embodiments thereof with reference to the accompanying drawings.

Figure 1:
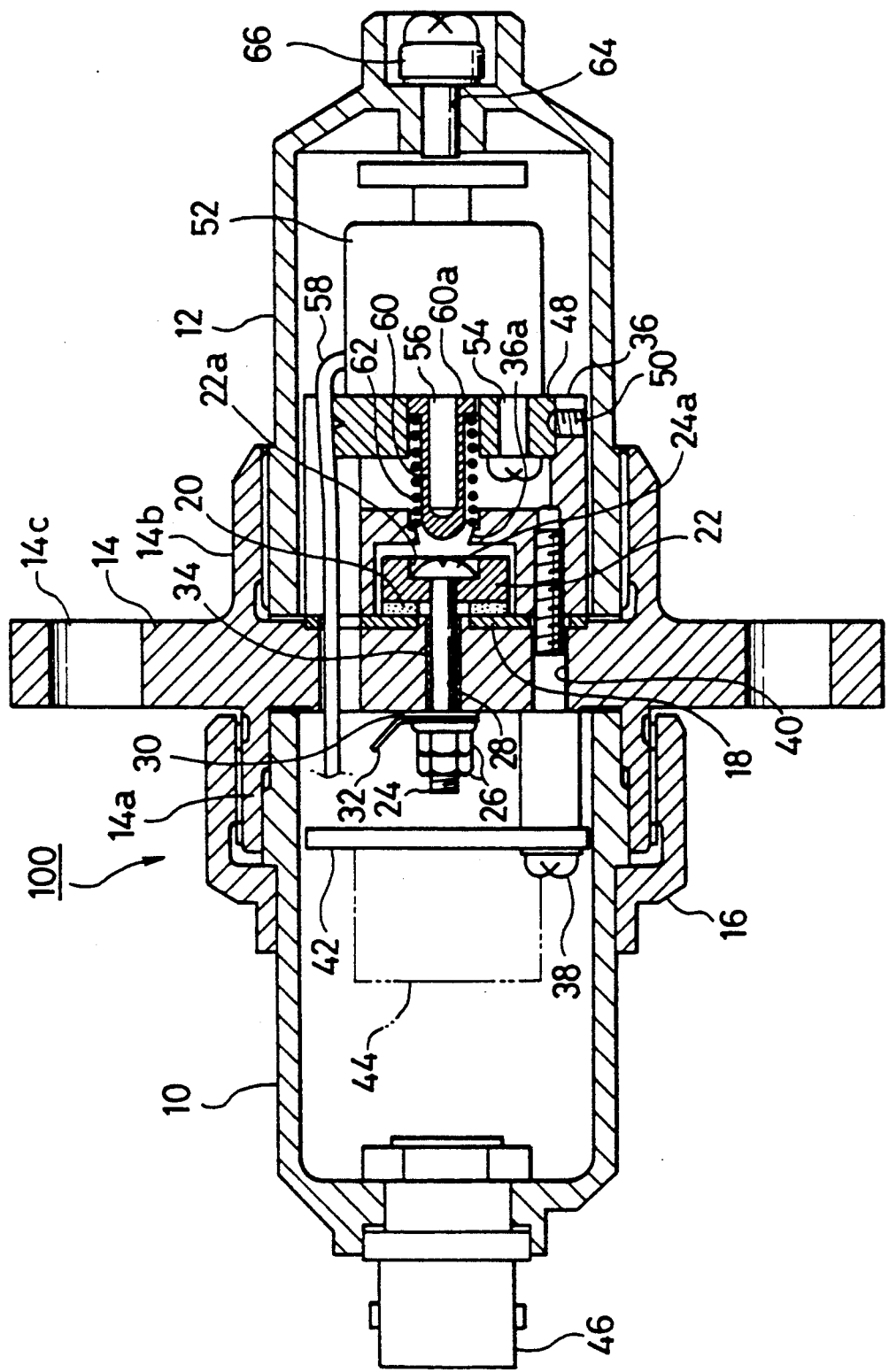
FIG. 1 is a sectional top plan view showing a shock sensor according to one embodiment of the present invention.
Figure 2:
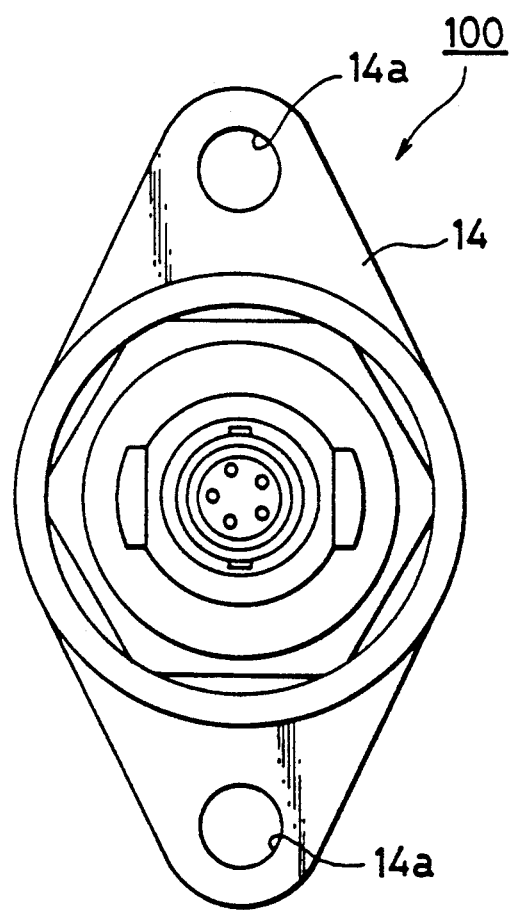
FIG. 2 is a lefthand side elevation showing the shock sensor.

FIG. 1 is a sectional top plan view showing a shock sensor according to an embodiment of the present invention, and FIG. 2 is a lefthand side elevation showing the same.

In FIG. 1, a first housing 10 and a second housing 12 individually having generally cylindrical shapes are connected through a flange 14. The flange 14 is integrally formed with a first cylindrical portion 14a and a second cylindrical portion 14b so that the first housing 10 is fitted in the first cylindrical portion 14a. The first housing 10 is joined to the flange 14 by means of a union nut 16 which is fastened on the first cylindrical portion 14a. The second cylindrical portion 14b has its inner circumference threaded to fasten the second housing 12.

Designated at reference numeral 14c are mounting holes which are formed in the flange 14 to mount the shock sensor on a vehicle.

In the second housing 12, there are arranged an electrode 18, a piezoelectric element 20 and an inertia member 22 which are sequentially laminated on the flange 14. These electrode 18, piezoelectric element 20 and inertia member 22 are individually ring-shaped to have center holes for receiving a bolt 24 therein. This bolt 24 has its head 24a fitted in a recess 22a, which is formed in the inertia member 22, and retained on the edge of the center hole of the inertia member 22.

The bolt 24 is inserted into a hole 28 which is bored in the center portion of the flange 14. The bolt 24 is so sufficiently fastened by a nut 26 that it is tensed to hold the electrode 18, the piezoelectric element 20 and the inertia member 22 in close contact. In other words, the bolt 24 and the nut 26 provide together in the present embodiment holding means for holding the electrode 18 and the inertia member 22 in close contact with the two sides of the piezoelectric element 20.

Incidentally, a lead terminal 32 is clamped between the nut 26 and the flange 14 through an insulating sheet 30. Moreover, an insulating member 34 is sandwiched between the inner circumference of the hole 28 and the bolt 24.

The electrode 18, the piezoelectric element 20 and the inertia member 22 are housed by a cylindrical inner casing 36. This inner casing 36 is fixed on the flange 14 by means of screws 38. Incidentally, these screws 38 are inserted into screw holes 40 which are formed in the flange 14.

The electrode 18 is enabled to transmit the voltage generated by the piezoelectric element 20 through the flange 14 and the screws 38. In the present embodiment, the aforementioned inertia member 22 is made of an electrically conductive material such as metal to transmit the output voltage of the piezoelectric element 20 through the bolt 24 to the terminal 32.

The screws 38 fixes a circuit base 42 on the flange 14. A circuit assembly 44 is mounted on the circuit base 42. The output voltage from the screws 38 and the terminals 32 is inputted to the circuit assembly 44 through a lead line (although not shown). The circuit assembly 44 has its output signal issued through a lead line (although not shown) to a connection terminal 46 which is mounted on the first housing 10.

On the righthand end face of the aforementioned inner casing 36, as seen in FIG. 1, there is fitted a plate 48 which is fixed by means of screws 50. An electromagnetic device 52 is fixed on that plate 48 by means of screws 54. This electromagnetic device 52 is equipped with a moving iron core 56, which can be moved forward to the left of FIG. 1 when the electromagnetic coil is energized through a lead line 58.

A cover 60 is fitted on the moving iron core 56. Between a flange 60a at the base end of the cover 60 and an inward flange 36a of the aforementioned inner casing, there is interposed a return spring 62 for urging the moving iron core 56 to the right of FIG. 1.

The second housing 12 has its end portion formed with a mouth 64 for confining an inert gas such as nitrogen gas in the housings 10 and 12. The mouth 64 is sealed up by a sealing plug 66.

A shock sensor 100 thus constructed is so mounted on the vehicle that its first housing 10 is directed to the front of the vehicle whereas its second housing 12 is directed to the back of the vehicle.

If an acceleration in the vehicle stopping direction is applied to the shock sensor 100, the inertia member 22 pushes the piezoelectric element 20 so that the piezoelectric element 20 generates a potential at a level according to the pushing force. This potential is transmitted on one hand through the electrode 18, the flange 14 and the screws 38 to the circuit assembly 44 and on the other hand through the inertia member 22 acting as an electrode, the bolt 24, the lead terminal 32 and the (not-shown) lead line to the circuit assembly 44. This circuit assembly 44 outputs a signal according to the generated voltage of the piezoelectric element 20 through the connection terminal 46 to an inflater operating circuit.

Figure 5:
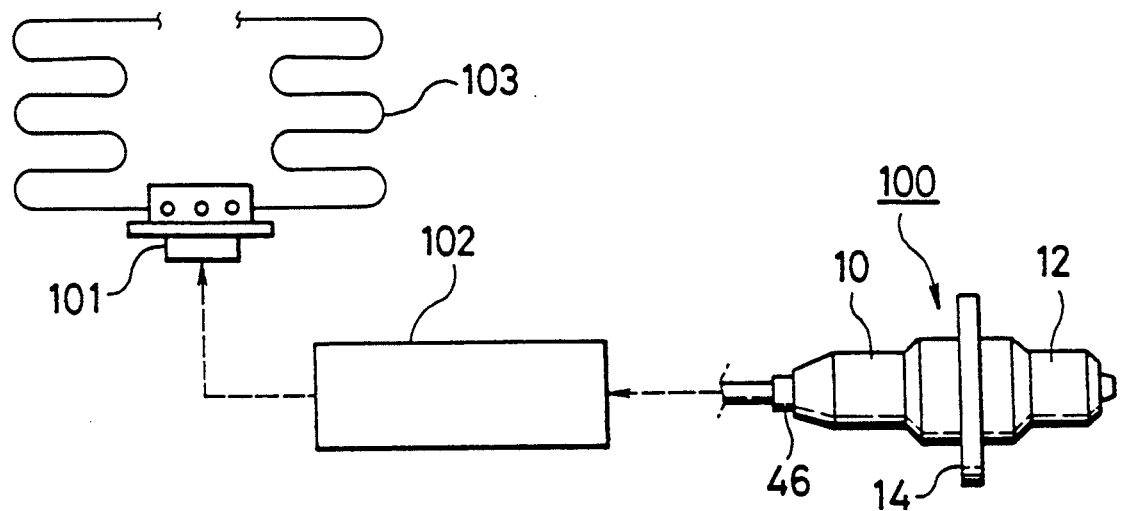
FIG. 5 is a flow chart showing an air bag system using a shock sensor.

As shown in FIG. 5, the detected signal of the shock sensor 100 is inputted to the inflater operating circuit 102. If the detected shock exceeds a predetermined (threshold) value, the inflater operating circuit 102 energizes to operate an inflater 101. As a result, an air bag 103 is inflated. If, on the other hand, the output voltage of the shock sensor 100 is lower than the threshold value, the inflater 101 is left inoperative.

Incidentally, the shock sensor 100 is so connected with the electric system of the vehicle that the electromagnetic device 52 may be energized when the ignition switch of the vehicle is turned on. When the electromagnetic device 52 has its coil energized, the moving iron core 56 is moved forward to the left of FIG. 1. Then, the cover 60 fitted on the moving iron core 56 hits the head 24a of the bolt 24. Then, the piezoelectric element 20 receives a shock having a magnitude according to the forward inertia force of the moving iron core 56, so that it outputs an according voltage. This output voltage is decided by a decision circuit, which is disposed in the inflater operating circuit 102, to check whether or not a predetermined voltage is outputted.

Thus, the operation of the shock sensor is checked by energizing the electromagnetic device 52. Incidentally, it is apparent that the operation check of the shock sensor can be utilized always not only when the ignition switch is turned on with the shock sensor being mounted on the vehicle but also when the shock sensor has its function checked in its factory.

Figure 3:
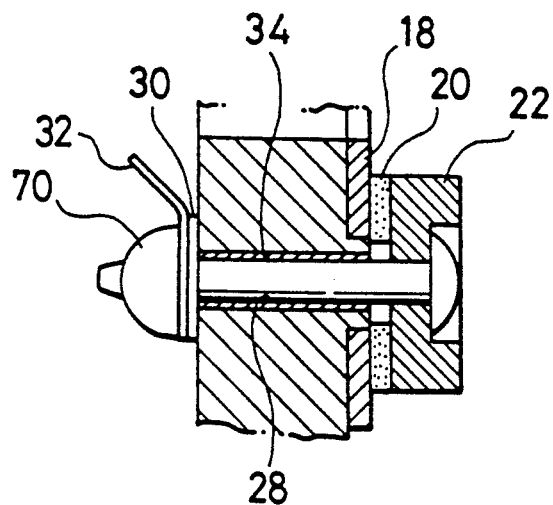
FIGS. 3 and 4 are sections showing the essential portions of individual shock sensors according to other embodiments of the present invention.

In the embodiment thus far described, the electrode 18, the piezoelectric element 20 and the inertia member 22 are fastened and held by the bolt 24 and the nut 26. In the present invention, however, the electrode 18, the piezoelectric element 20 and the inertia member 22 may be held in close contact, as shown in FIG. 3, by means of a rivet 70.

Figure 4:
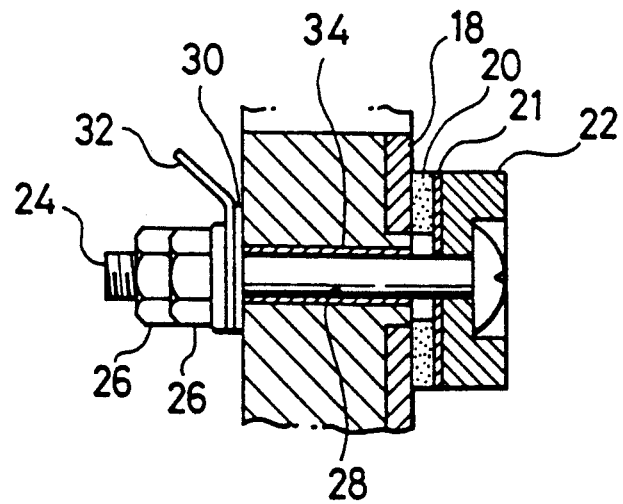

In the foregoing embodiment, moreover, the inertia member 22 is made of an electrically conductive material such as metal and given a function as the electrode by contacting with the piezoelectric element 20 directly. In the present invention, however, an electrode 21 may be sandwiched between the inertia member 22 and the piezoelectric element 20, as shown in FIG. 4. In this modification, however, the electrode 21 is electrically connected with the bolt 24.

The circuit assembly 44 connects the impedance to and outputs the signal according to the voltage through the connection terminal 46 to the inflater operating circuit.

Figure 6:
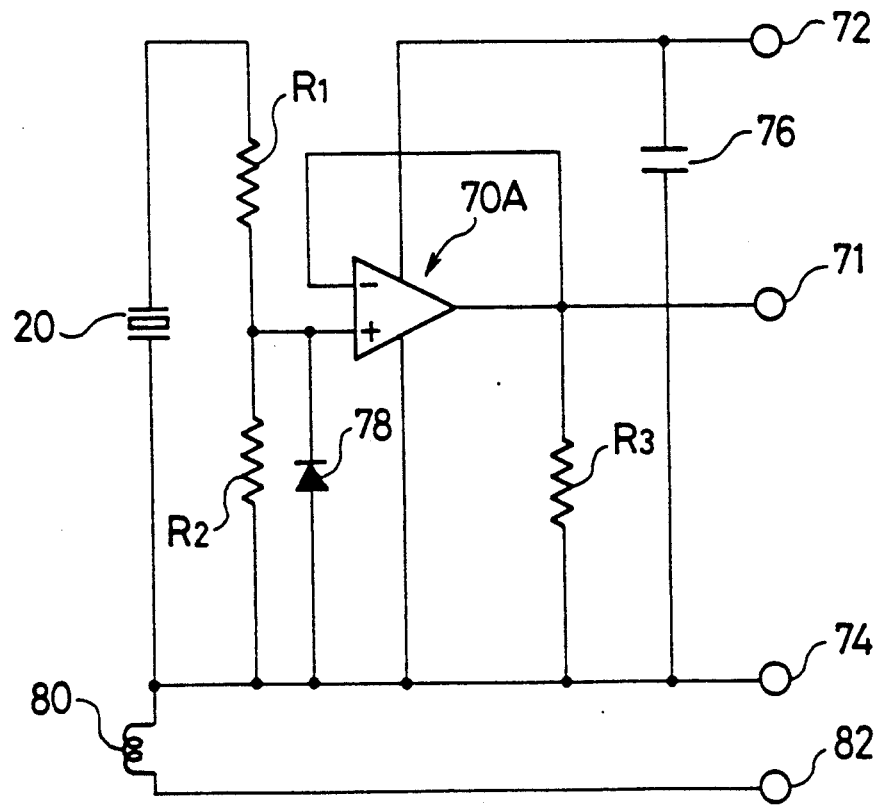
FIG. 6 is a circuit diagram showing a circuit assembly.

A circuit diagram of the impedance converter disposed in the aforementioned circuit assembly 44 is shown in FIG. 6.

In FIG. 6, resistors $R_1$ (of 10 MΩ) and $R_2$ (of 3.3 MΩ) are connected in series between the electrode 18 at one side of the piezoelectric element 20 and the inertia member 22 acting as the opposite polarity. As a result, the voltage divided by the two resistors $R_1$ and $R_2$ is inputted to the non-inverted input terminal of an operation amplifier 70A. The inverted input terminal of the operation amplifier 70A is connected with an output terminal 71 of the same to establish a negative feedback. The operation amplifier 70A is energized by the battery of the vehicle through positive and negative power supply terminals 72 and 74. Between these two terminals 72 and 74, there is connected a filter capacitor 76 for absorbing a surge at the time of igniting the automotive engine. The aforementioned piezoelectric element 20 has its one electrode connected with the negative power supply terminal 74. Designated at reference numeral 78 is a Zener diode which is connected with the aforementioned resistor $R_2$ so as to prevent a voltage at a predetermined level or more from being loaded upon the operation amplifier 70A by the piezoelectric element 20. Designated at numeral 80 is a coil of the aforementioned electromagnetic device 52, which can be energized through a terminal 82 and the negative power supply terminal 74. Reference letter R₃ designates an output resistor (of 2 KΩ).

By this combination of the negative feedback operation amplifier and the output resistor R₃, the impedance of the output to be extracted from between the terminals 71 and 74 can be reduced to stabilize the shock detecting operation.

Figure 7:
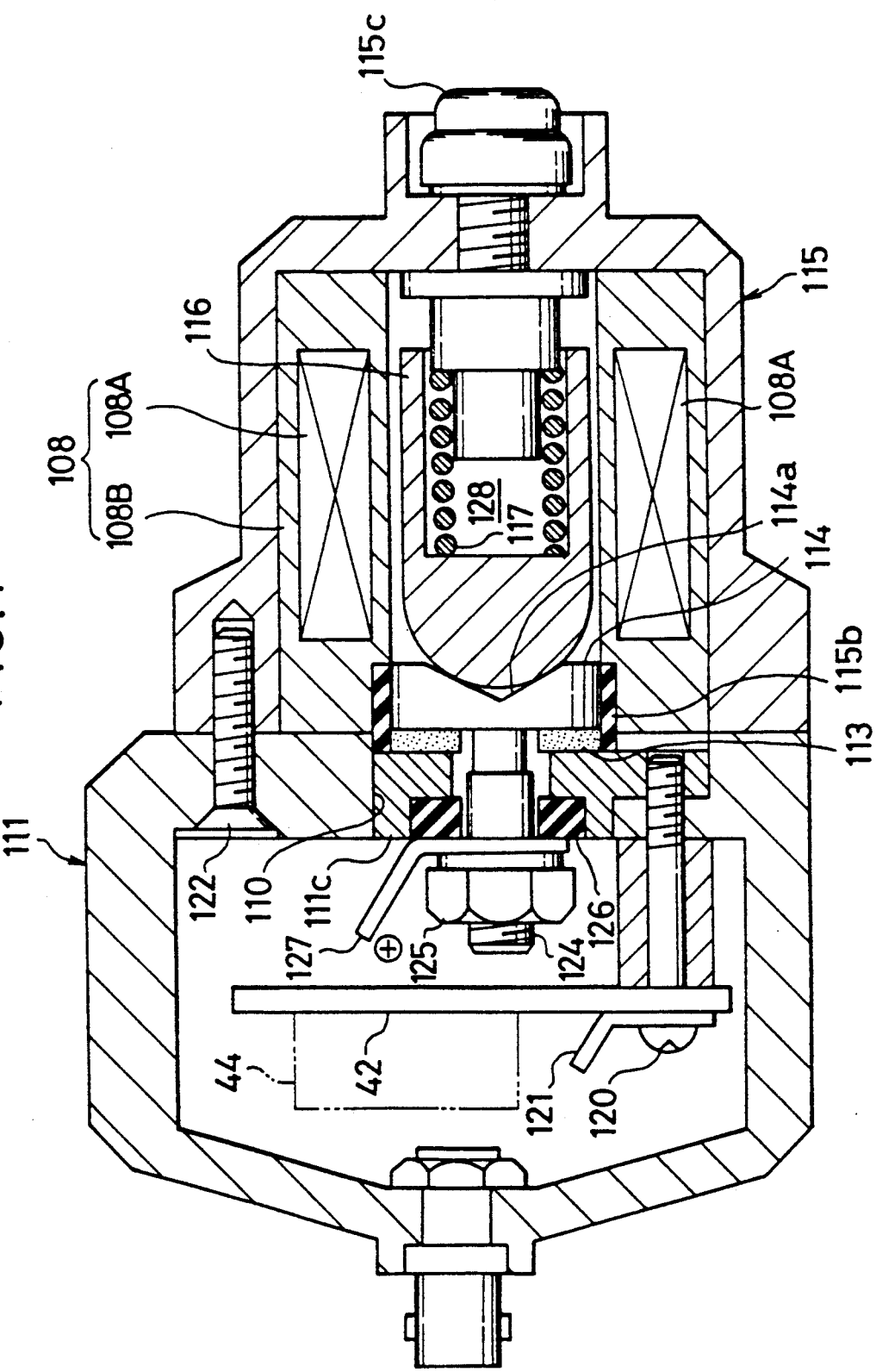
FIG. 7 is a sectional top plan view showing a shock sensor according to another embodiment of the present invention.

FIG. 7 is a section showing a shock sensor according to another embodiment of the present invention.

In this embodiment, a housing 111 has its one end opened, as indicated at 110, to fit a ring-shaped cathode plate 111c therein. This cathode plate 111c is fastened by a bolt 120 of an electric conductor, which has its head connected with a cathode lead terminal 121.

On one end of the housing 111, there is fixed by screws 122 a cap 115 which houses an electromagnetic device 108 along its inner circumference. This electromagnetic device 108 is composed of a coil 108A and a cylindrical core 108B made of a ferromagnetic material. This core 108B is arranged coaxially with the aforementioned opening 110 and further with a pressure receiving member 114 and an inertia member 116. A piezoelectric element 113 is clamped between the pressure receiving member 114 and the cathode plate 111c, and an insulating cylinder 115b is arranged on the outer circumferences of those pressure receiving member 114 and piezoelectric element 113.

The pressure receiving member 114 acts as an anode and fixes a rod 124 such that the rod 124 extends normally of the face of the pressure receiving member 114. A nut 125 is fastened on the leading end of the rod 124 to clamp an anode lead terminal 127 between itself and the cathode plate 111c through an insulating member 126.

The pressure member 114 is formed with a vertical groove 114a which is vertically arranged.

The inertia member 116 has its leading end shaped semispherical to slidably engage with the vertical groove 114a of the pressure receiving member 114. The inertia member 116 is bored, as indicated at 128, from its rear end face so that a spring 117 is fitted in the bore 128. The spring 117 is interposed under compression between an adjusting bolt 115c fastened in the aforementioned cap 115 and the bottom of the bore 128. The leading hemisphere of the inertia member 116 is pushed into the vertical groove 114a of the pressure receiving member 114 by the pushing force of that spring 117. As a result, the piezoelectric element 113 is interposed under a constant pushing force of the spring 117 between the pressure receiving member 114 and the cathode plate 111c.

In the shock sensor having the structure thus far described, the circuit base 42 is fixed by the aforementioned bolt 120 while mounting the circuit assembly 44 thereon. This circuit assembly 44 has a structure identical to that of the foregoing embodiment and operates, as follows.

WITH NO COLLISION

In an non-collision, what is transmitted to the piezoelectric element 113 through the pressure receiving member 114 is the static force of the spring 117 acting upon the inertia member 116. As a result, no peak voltage is outputted from the piezoelectric element 113.

Thus, the shock sensor does not react without any collision.

UPON VERTICAL VIBRATIONS

When the vehicle receives vertical vibrations, it vibrates the shock sensor.

At this time, the inertia member 116 slides in the vertical groove 114a, but the pushing force for the spring 117 to push the inertia member 116 onto the vertical groove 114a hardly changes so that the piezoelectric element 113 does not provide a voltage higher than the set (threshold) voltage.

As a result, the shock sensor will not react in response to the vertical vibrations.

UPON HEAD-ON AND OBLIQUE COLLISIONS

At an instant when the vehicle collides head-on, the force for pushing the pressure receiving member 114 is abruptly increased by the shocking acceleration of the inertia member 116.

The force applied to the pressure member 114 is transmitted to the piezoelectric element 113.

Figure 8:
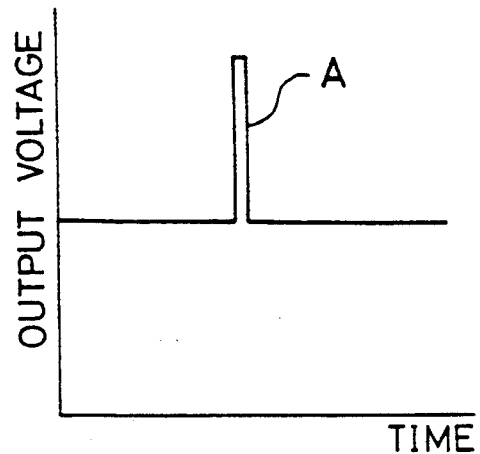
FIG. 8 is a waveform chart showing a voltage to be outputted at a collision time.

As a result, the piezoelectric element 113 generates a high peak voltage exceeding the set (threshold) level, as indicated at A in FIG. 8. In response to this peak voltage, the inflater operating circuit 102 operates the inflater 101. As a result, the air bag 103 is inflated.

Even if the vehicle receives a shock obliquely from its front, a component of the shocking acceleration acts upon either of the two sides of the vertical groove 114a so that it is transmitted to the piezoelectric element 113. In this case, too, a peak voltage exceeding the set (threshold) level is outputted so that the inflater 101 is operated to inflate the air bag 103.

UPON SIDE COLLISIONS

If the vehicle collides laterally, the inertia member 16 will quickly move upward or downward of FIG. 7. Then, the force in the direction of this movement is divided by the oblique side of the vertical groove 114a so that its component in the leftward direction of FIG. 7 pushes the pressure receiving member 114. As a result, the piezoelectric element 113 is pushed as in the case of the head-on collision by the pressure receiving member 114. Since, however, the pushing force of this case is low, the voltage generated by the piezoelectric element 113 is lower than the predetermined (threshold) value. As a result, the inflater operating circuit will not operate the inflater so that the air bag is left uninflated.

UPON REAR-END COLLISIONS

If the vehicle is hit from behind, a shocking force acts upon the shock sensor in the leftward direction of FIG. 7 so that the inertia member 116 having abutted under a constant pressure against the pressure receiving member 114 leaves the vertical groove 114a for an instant.

Figure 9:
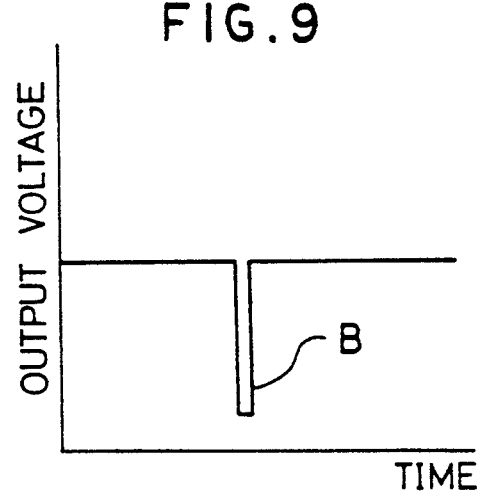
FIG. 9 is a waveform chart showing a voltage to be outputted upon a collision from behind.

Then, the piezoelectric element 13 is released from the force so that its output voltage abruptly drops. The waveform of the output voltage at this time has an abrupt voltage drop, as indicated at B in FIG. 9. As a result, the positive peak voltage, as indicated at A in FIG. 8, is not fed to the circuit so that the inflater operating circuit 102 feed no current for operating the inflater 101.

Moreover, the shock sensor of FIG. 7 can self-check the operation in the following manner.

For this self-check, the coil 108A is energized for a short time from the check circuit.

Specifically, the coil 108A is shortly energized to generate such a magnetic flux as to retract the inertia member 116 instantly to the right of the drawing. Then, the piezoelectric element 113 outputs a voltage having a waveform shown in FIG. 10.

Figure 10:
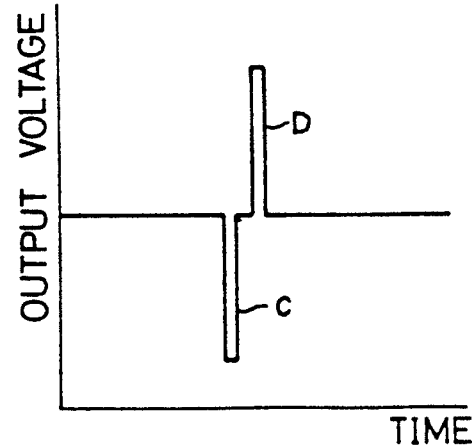
FIG. 10 is a waveform chart showing a voltage to be outputted at a time of a self-check.

More specifically, if the inertia member 116 is instantly retracted by energizing the electromagnet 108, it acts upon the pressure receiving member 114 to reduce the pushing force of the spring 117 so that the voltage to be outputted abruptly drops, as indicated at C in FIG. 10.

At an instant when the electromagnet 108 is deenergized, the inertia member 116 is caused to collide against the pressure receiving member 114 by the pushing force of the spring 117. Then, a high pushing force is applied to the piezoelectric element 113 so that it outputs a positive peak voltage, as indicated at D in FIG. 10.

In short, the check circuit checks whether or not a predetermined voltage is outputted from the piezoelectric element 113, under the same condition as that of the rear-end and head-on collisions.

Whether or not the operation of the shock sensor is normal may be indicated by means of a lamp in response to the signal obtained from the check circuit.

Figure 11:
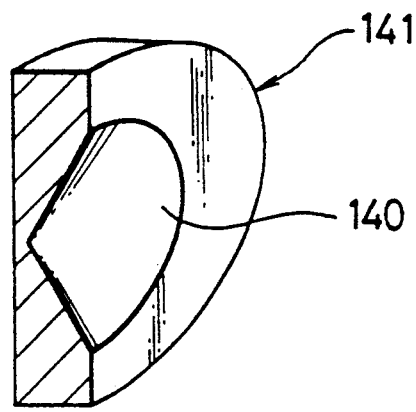
FIG. 11 is a perspective section showing an electrode plate or pressure receiving plate.
Figure 12:
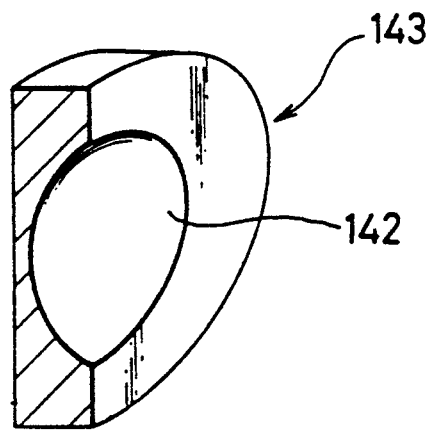
FIG. 12 is a perspective section showing another electrode plate or pressure receiving plate.

Although the inertia member 116 of the foregoing embodiments is in engagement with the groove 114a having a V-shaped section, the present invention may be exemplified either by an electrode plate or pressure receiving member 141 having a conical recess 140, as shown in FIG. 11, or by an electrode plate or pressure receiving member 143 having a recess 142 with a curved surface, as shown in FIG. 12. This recess 142 of FIG. 12 may have a spherical surface or an ellipsoidal surface of revolution.

As is now apparent from the description thus far made, the casing is formed of the housings 10 and 12 and the flange 14d in the embodiment of FIGS. 1 to 6 and the housing 111 and the cap 115 in the embodiment of FIGS. 7 to 12.

I claim:

1. A shock sensor comprising:
   first and second housings;
   a flange for connecting the first housing and the second housing and having a through hole substantially at a center thereof;
   a first electrode directly mounted on said flange on a side of said second housing;
   a piezoelectric element mounted on said first electrode for generating, when pushed, a voltage having a level according to a pushing force;
   an inertia member held in close contact with said piezoelectric element at a side opposite to the first electrode, said inertia member operating as a second electrode;
   holding means inserted in said through hole, said first electrode, said piezoelectric element, and said inertia member for holding said piezoelectric element and said inertia member in a close contact with a predetermined pressure; and
   a lead terminal held by said holding means via an insulating sheet on said flange on a side of said first housing such that it is connected to said inertia member via said holding means,
   wherein said inertia member pushes said piezoelectric element with a pushing force according to a shock, if this shock is applied to said shock sensor, so that said piezoelectric element generates a voltage having a level according to the pushing force, said voltage being outputted from said lead terminal within said first housing.

2. A shock sensor according to claim 1, wherein said holding means urges said piezoelectric element and said inertia member in a direction to come into the close contact.

3. A shock sensor according to claim 1, wherein said holding means includes a bolt and a nut.

4. A shock sensor according to claim 1, wherein said holding means includes a rivet.

5. A shock sensor according to claim 1, wherein said inertia member is so made of an electrically conductive material in at least its face contacting with said piezoelectric element as to act as the second electrode, wherein the first electrode having an opposite polarity is disposed at a side opposite to said inertia member across said piezoelectric element, and wherein said inertia member, said piezoelectric element and said electrode are held by said holding means.

6. A shock sensor according to claim 1, further comprising an inner case for covering the first electrode, piezoelectric element and inertia member therein, and a screw passing through the flange to hold the inner case to the flange.

7. A shock sensor according to claim 6, further comprising a circuit base held by said screw within said first housing, said screw serving as a lead.

8. A shock sensor according to claim 1, further comprising means made receptive of the output voltage of said piezoelectric element for deciding whether or not said output voltage is higher than a predetermined voltage to output a signal for inflating an air bag if said predetermined voltage is exceeded.

9. A shock sensor according to claim 1, further comprising an electromagnetic device having a moving iron core for applying an external force to said inertia member in a direction to push said piezoelectric element so that the operations of said shock sensor can be checked by energizing said electromagnetic device.

* * * * *